3,502,663
CRYSTALLINE CEPHALOSPORIN, METHOD
FOR ITS MANUFACTURE
Albert J. Barnes, Jr., Indianapolis, Ind., assignor to Eli
Lilly and Company, Indianapolis, Ind., a corporation
of Indiana
No Drawing. Filed Apr. 21, 1969, Ser. No. 818,057
Int. Cl. C07d 99/24
U.S. Cl. 260—243                                              1 Claim

ABSTRACT OF THE DISCLOSURE

Cephalexin monohydrate crystals, dense, large crystals, useful in formulations of the antibiotic, are prepared by spraying cephalexin with an excess of water and drying to constant weight.

BACKGROUND OF THE INVENTION

Cephalexin is a generic term used to identify a chemical compound, 7-(D-α-aminophenylacetamido)-3-methyl-3-cephem-4-carboxylic acid:

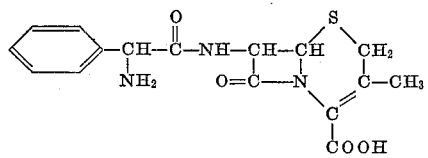

This antibiotic is active as a broad spectrum antibiotic effective in controlling diseases caused by a wide variety of Gram-positive and Gram-negative microorganisms. One of the unique features of this cephalosporin is that it has shown outstanding advantages for use as an oral antibiotic.

Cephalexin is one of the semi-synthetically produced cephalosporins. It can be made, for example, by acylating the cephalosporin nucleus, 7-aminocephalosporanic acid, commonly known as 7-ACA, in an aqueous medium with a mixed anhydride form of D-phenylglycine in which the free amino group has been protected by a suitable blocking group, to form the 7-(D-α-[blocked amino]-phenylacetamido)cephalosphoranic acid, removing the blocking group by conventional methods to form 7-(D-α-aminophenylacetamido)cephalosporanic acid, and converting the latter compound to the corresponding 3-desacetoxy compound, cephalexin, by hydrogenolysis, as for example by the method of Stedman, U.S. Patent 3,124,576. Alternative methods of effecting the acylation of 7-ACA and the hydrogenolysis of the acetoxy group are well known to those skilled in the art. It is also known that cephalexin can be prepared by a procedure in which the foregoing process steps are reversed, i.e. the cephalosporin nucleus can be hydrogenolyzed to the 3-desacetoxy-7-ACA and then acylated to form the desired cephalexin.

The source material for the 7-ACA employed in the foregoing synthesis is cephalosporin C, more precisely known as 7-(5'-aminoadipamido)cephalosporanic acid, which can be prepared by cultivating a cephalosporin C-producing organism in a suitable nutrient medium as described in British Patent 810,196, and can then be readily converted into the corresponding nucleus compound, 7-aminocephalosporanic acid, by cleaving the 5'-amino-N'-adipamyl side chain between its amido carbonyl group and its amido nitrogen by known procedures.

An alternative preferred method of preparing cephalexin employs the ring-expansion process of Morin and Jackson, U.S. Patent 3,275,626.

Recrystallization of cephalexin, without regard to the method whereby it is produced, from organic solvents such as acetonitrile, N,N-dimethylformamide, dimethylsulfoxide, methanol, ethanol, and the like, yields an anhydrous product. The anhydrous product is characteristically a small-fiber like crystal which is fluffy and bulky, and hygroscopic in nature. It easily picks up a static charge, and is relatively unstable because of its hygroscopic properties. These characteristics are particularly troublesome in preparing the compound for pharmaceutical uses. The charged particles repel one another and tend to be flyaway when being weighed and when being filled into capsules. The water absorbed because of the material's hygroscopicity, although tending to neutralize the static charge, causes the crystals to change weight and to make accurate weighing difficult.

It is an object of this invention to provide a method for obtaining a new crystalline form of cephalexin which overcomes the disadvantages inherent in the prior art forms.

SUMMARY OF THE INVENTION

In fulfillment of the aforementioned object, this invention provides a method for obtaining a novel crystalline cephalexin monohydrate.

The crystals of this new form of cephalexin are large and extremely dense, and are admirably adapted for formulation, particularly into solid dosage forms, such as filled capsules and the like.

In accordance with the present invention crystalline cephalexin monohydrate is prepared by hydration of anhydrous cephalexin by the addition of about 20 to about 50% by weight of water and subsequent removal of the excess water.

DETAILED DESCRIPTION

The novel crystalline form provided by the process of this invention has the following unique X-ray diffraction properties at $\lambda = 1.5405$ using a Cu:Ni 45 kv. 20 ma. source.

| Spacing, $d$: | Relative intensities, $I/I_1$ |
|---|---|
| 15.15 | .40 |
| 11.85 | 1.00 |
| 11.00 | .30 |
| 9.36 | .20 |
| 8.55 | .50 |
| 7.86 | .50 |
| 6.89 | .20 |
| 5.98 | .40 |
| 5.39 | 1.00 |
| 4.97 | .50 |
| 4.76 | .40 |
| 4.57 | .40 |
| 4.39 | .60 |
| 4.22 | .60 |
| 4.00 | .70 |
| 3.86 | .70 |
| 3.60 | .80 |
| 3.46 | .30 |
| 3.24 | .60 |
| 3.10 | .60 |
| 2.98 | .40 |
| 2.90 | .60 |
| 2.81 | .40 |
| 2.73 | .20 |
| 2.68 | .40 |
| 2.63 | .10 |
| 2.47 | .30 |
| 2.41 | .15 |
| 2.31 | .30 |
| 2.25 | .30 |
| 2.12 | .10 |

| Spacing, d: | Relative intensities, $I/I_1$ |
|---|---|
| 2.09 | .05 |
| 2.01 | .02 |
| 1.93 | .05 |
| 1.87 | .05 |
| 1.85 | .05 |
| 1.82 | .10 |
| 1.72 | .05 |
| 1.66 | .02 |
| 1.62 | .02 |

The crystals are large in form and are extremely dense. The size and density characteristics afford a considerably greater ease in formulating operations.

In addition to using this crystalline monohydrate in formulating operations, this monohydrate can be vacuum dried at elevated temperatures, as for example 60° C. to form an anhydrate with the same crystalline form as the monohydrate. This new crystalline anhydrate can also be used in formulating pharmaceutical compositions containing cephalexin.

The process of this invention provides a method for obtaining the hereinbefore described crystalline cephalexin monohydrate from cephalexin. By the process of this invention cephalexin is placed in a large rotating vessel and about 20 to about 50% by weight of water is added. This amount of water does not form an appreciable aqueous phase or cause slurrying to occur.

Optionally, the mixture is allowed to tumble in this rotating vessel for about one or more hours at about ambient room temperature to effect complete conversion to the monohydrate crystalline form. The mixture is then subjected to vacuum drying to about 4 to 8 percent water concentration.

The addition of a substantially lesser amount of water is to be avoided as it could result in incomplete conversion to the monohydrate crystalline form; a greater amount will cause slurrying and make drying difficult.

The operability of this method to effect the modification of the crystal structure of cephalexin is unexpected and surprising since the exposure of cephalexin to a humid atmospheric condition will hydrate the molecule forming a mixture of mono- and dihydrate without the concomitant change in crystal structure. Cephalexin hydrated by exposure to moist air does not lose its tendency to pick up a static charge and become flyaway.

Those skilled in the art can more readily understand this invention from the following specific example.

EXAMPLE

Cephalexin (17.43 kg.) was placed in a Devine rotary jacketed drier. Recirculatory water at 20° C. was passed through the jacket during the hydration procedure. Rotation was begun and deionized water (6.97 l.) was added as a fine spray from a pressurized vessel over a one hour period. Rotation was discontinued and the interior of the drier was scraped down. A vacuum was applied to the drier for two hours without stirring and then released.

The whole mixture was allowed to stand at room temperature in the drier for 18 hours. Rotation was then begun and the temperature of the vessel was raised to 30° C. A vacuum was applied to the vessel for 12 hours until the vessel had attained an internal pressure or 8 mm. Hg at an internal temperature of 30° C. The sample was then ground in a Fitzpatrick mill prior to formulating.

I claim:

1. A method for preparing cephalexin monohydrate which comprises commingling cephalexin with about 20 to about 50 percent of its dry weight of water at about room temperature and drying the resulting crystalline cephalexin monohydrate to about 4 to about 8 percent water content.

No references cited.

NICHOLAS S. RIZZO, Primary Examiner